United States Patent [19]
Arata et al.

[11] Patent Number: 5,417,747
[45] Date of Patent: May 23, 1995

[54] WATERBASED INK COMPOSITION FOR INK-JET PRINTING

[75] Inventors: Satoru Arata; Issei Kawabata; Yoshihiko Uchioki, all of Himeji, Japan

[73] Assignee: Mikuni Shikiso Kabushiki Kaisha, Himeji, Japan

[21] Appl. No.: 183,398

[22] Filed: Jan. 19, 1994

[30] Foreign Application Priority Data

Jan. 22, 1993 [JP] Japan .................................. 5-009392

[51] Int. Cl.$^6$ ............................................. C09D 11/02
[52] U.S. Cl. ................. 106/20 D; 106/20 R; 106/20 C
[58] Field of Search ................. 106/20 R, 23 R, 23 C, 106/20 C, 20 D

[56] References Cited

U.S. PATENT DOCUMENTS

5,167,704  12/1992  Brower .............................. 106/30 R
5,302,193   4/1994  Wouch et al. ..................... 106/20 R

FOREIGN PATENT DOCUMENTS

2-276870  11/1990  Japan .
4-239065   8/1992  Japan .

OTHER PUBLICATIONS

Derwent Abstract of JP-A 4-145172 (May 19, 1992).
Derwent Abstract of JP-A 4-236275 (Aug. 25, 1992).
Patent Abstracts of Japan, vol. 9, No. 041 (C-267) (Feb. 21, 1985) of JP-A 59-184270 (Oct. 19, 1984).

*Primary Examiner*—Helene Klemanski
*Attorney, Agent, or Firm*—Armstrong, Westerman, Hattori, McLeland & Naughton

[57] ABSTRACT

A waterbased ink composition for ink-jet printing including a pigment, an aqueous medium and a monoterpene or sesquiterpene excellent in coloring property and water resistance, which does not stop up the nozzle nor feather, and by which the stable printed images can be continuously formed without any distortion.

7 Claims, No Drawings

WATERBASED INK COMPOSITION FOR INK-JET PRINTING

BACKGROUND OF THE INVENTION

The present invention relates to a waterbased ink composition for ink-jet printing, and more particularly to a waterbased ink composition for ink-jet printing which can be suitably used for various ink-jet printing methods.

As a recording type, the ink-jet printing method has been hitherto noted from the viewpoint of its quietness, low running cost and the like, and various ink compositions for ink-jet printing have been proposed.

Properties which are required for an ink for ink-jet printing are a property that the ink of printed images does not feather, a property that a nozzle is not stopped up, a property that printing can be stably and continuously carried out without distorting printed figures, excellent coloring property, excellent water resistance of the printed images, excellent storage stability, high safety and the like. Among these properties, the properties that the ink of printed images does not feather and that the nozzle is not stopped up are especially required. Therefore, it is desired that an ink for ink-jet printing having the above two properties is developed.

Accordingly, there has been proposed an ink for ink-jet printing which contains a resin and the like so that the ink of the printed images would not feather. However, when such an ink for ink-jet printing is used, its nozzle is easily stopped up. Accordingly, as an ink for ink-jet printing which is not easily dried and does not stop up the nozzle, there has been proposed an ink for ink-jet printing containing a large amount of delayed drying material and the like.

However, when the amount of the above-mentioned delayed drying material in the ink for ink-jet printing is increased, there occurs some problems such that the viscosity of the ink becomes too high and that the course of flight of droplets of the ink for ink-jet printing is distorted and distortion of the printed images is easily caused.

Also, in recent years, an ink jet printer which is charged with a dyestuff type waterbased ink has been used. However, when the printed images are formed by using such a dyestuff type waterbased ink, there is a problem that the ink of the printed images easily feathers and is not excellent in water resistance.

An object of the present invention is to provide a waterbased ink composition for ink-jet printing which does not stop up a nozzle and does not feather.

A further object of the present invention is to provide a waterbased ink composition for ink-jet printing by which the printed images can be stably and continuously formed without distorting the printed images.

A still further object of the present invention is to provide a waterbased ink composition for ink-jet printing which has excellent coloring property and excellent water resistance.

These and other objects of the present invention will become apparent from the description hereinafter.

SUMMARY OF THE INVENTION

In accordance with the present invention, it is provided a waterbased ink composition for ink-jet printing comprising a pigment, an aqueous medium and a monoterpene or sesquiterpene.

DETAILED DESCRIPTION

A waterbased ink composition for ink-jet printing of the present invention contains a pigment, an aqueous medium and monoterpene or sesquiterpene as mentioned above.

The pigment which can be used in the present invention is not particularly limited. As the pigment, various organic pigments or various inorganic pigments can be used.

Concrete examples of the organic pigments are, for instance, azo pigments, naphthol pigments, isoindolinone pigments, anthraquinoroid pigments, thioindigoid pigments, dioxazine pigments, quinacridone pigments, phthalocyanine pigments, diketo-pyrrolo-pyrrol, styrene pigments, perylene pigments, various lake pigments, and the like.

Concerte examples of the inorganic pigments are, for instance, carbon black, titanium dioxide, iron oxide, ultramarine, metal powder, and the like.

The average particle diameter of the pigment depends upon the nozzle size of a used printer. It is preferable that the average particle diameter of the pigment is small. It is generally desirable that the average particle diameter of the pigment is 0.01 to 3 $\mu$m, preferably 0.05 to 1 $\mu$m, more preferably 0.05 to 0.3 $\mu$m. When the average particle diameter of the pigment is within the above-mentioned range, there is an advantage that coagulation is not caused and the pigment can be easily and uniformly dispersed in the ink composition.

In the present invention, in order to adjust the average particle diameter of the pigment to a desired range, the pigment to be used can be previously ground before preparing the ink composition by means of a grinding mill such as beads mill, roll mill, jet mill or ultrasonic dispersion machine, or can be ground after preparing the ink composition by means of the above-mentioned grinding mill as described later. Alternatively, the ink composition of the present invention can be also prepared by using a dispersion which is prepared by previously dispersing the pigment having an average particle diameter within the desired range in water and the like.

The amount of the pigment is preferably 1 to 15 parts by weight, more preferably 3 to 10 parts by weight per 100 parts by weight of the ink composition. When the amount of the pigment is less than 1 part by weight, colorability of the ink composition tends to be worse, and when the amount is more than 15 parts by weight, viscosity of the resulting ink composition increases and therefore stability thereof tends to lower.

As an aqueous medium which can be used in the present invention, there are exemplified water, a mixture of water, a dispersing agent and an agent for imparting delayed drying property, and the like.

The above-mentioned water is not particularly limited, and for instance, ion-exchanged water can be used. The amount of the water may be determined so that amounts of the pigment, and other components which are described below such as a dispersing agent, an agent for imparting delayed drying property and a monoterpene or sesquiterpene can be within a desired range.

Concrete examples of the dispersing agent are, for instance, an acrylic resin such as a styrene-(meth)-acrylic acid copolymer, an alkylstyrene-(meth)acrylic acid copolymer, styrene-(meth)acrylic acid-alkyl(meth)acrylate terpolymer or a (meth)acrylic acid-alkyl (meth)acrylate copolymer; a water-soluble resin neutralized with an alkali such as a water-soluble synthetic resin neutralized with an alkali, e.g. a salt of the acrylic resin and the like, or a water-soluble natural resin neutralized with an alkali, e.g. rosin, shellac, casein, and the like. These dispersing agents can be used alone or in an admixture thereof. Among these examples, the water-soluble synthetic resin neutralized with an alkali which hardly decays is preferably used from the viewpoint of the prolonged storage stability of the resulting ink composition. The term "water-soluble resin neutralized with an alkali" means a resin which has an acidic group such as carboxyl group in its structure and water-solubilized by neutralizing the acidic group with an alkali such as ammonia or an amine. The water-soluble resin neutralized with an alkali also acts as a binder.

Generally, the weight average molecular weight of the water-soluble resin neutralized with an alkali is usually preferably about 3000 to about 30000, more preferably about 5000 to about 15000. When the weight average molecular weight is too large, viscosity of the resulting ink composition is too high and therefore the ink composition tends to be unsuitable for printing. On the other hand, when the weight average molecular weight is too small, the effect of the resin as a binder in the ink composition tends to lower.

The water-soluble resin neutralized with an alkali is used in order to uniformly disperse the pigment in the ink composition and fix the pigment on paper. The amount of the water-soluble resin neutralized with an alkali cannot be absolutely determined because the amount depends on the type and the amount of the used pigment. However, in general the amount of the water-soluble resin neutralized with an alkali is preferably at least 0.05 part by weight, more preferably at least 0.1 part by weight, per 100 parts by weight of the resulting ink composition. When the amount of the water-soluble resin neutralized with an alkali is less than 0.05 part by weight, the dispersibility of the pigment and the stability of the resulting ink composition tend to lower. When the amount of the water-soluble resin neutralized with an alkali is too large, the viscosity of the resulting ink composition remarkably increases and the ink composition becomes unsuitable for printing. Therefore, it is desirable that the amount of the water-soluble resin neutralized with an alkali is at most 30 parts by weight, preferably at most 15 parts by weight per 100 parts by weight of the resulting ink composition.

The water-soluble resin neutralized with an alkali can be used after previously blended with water, or can be blended at the same time of mixing the pigment, water, and monoterpene or sesquiterpene described below.

When blending the water-soluble resin neutralized with an alkali with water, it is preferable to use a neutralizer, an auxiliary solvent and the like.

Concrete examples of the neutralizer are, for instance, aminomethylpropanol, monoethanolamine, diethanolamine, triethanolamine, isopropanolamine, morpholine, aqueous ammonia and the like. These can be used alone or in an admixture thereof.

Concrete examples of the auxiliary solvent are, for instance, propylene glycol, is isopropanol and the like. These can be used alone or in admixture thereof.

In the present invention, besides the water-soluble resin neutralized with an alkali, there can be also used as a dispersing agent, various surfactants such as anionic surfactants, cationic surfactants, nonionic surfactants and amphoteric surfactants in a desired amount.

Concrete examples of the agent for imparting delayed drying property are, for instance, saccharides such as mattirol, sorbitol, sucrose and lactose; polyhydric alcohols such as glycerol, ethylene glycol, diethylene glycol, polyethylene glycol, propylene glycol, dipropylene glycol and thiodiglycol; amines such as monoethanolamine, diethanolamine, triethanolamine, monoisopropanolamine, diisopropanolamine and triisopropanolamine; amides such as formamide and acetoamide; urea; N-methylpyrrolidone; silicone surfactants and the like. These can be used alone or in an admixture thereof. The amount of the agent for imparting delayed drying property is preferably about 3 to about 50 parts by weight per 100 parts by weight of the resulting ink composition.

In the present invention, there can be also used lower monohydric alcohols such as methanol, ethanol and propanol in order to regulate the drying property of the ink composition.

To the aqueous medium, if necessary, these can be added various additives for ink, for instance, a pH regulator such as aminomethylpropanol, an antifoaming agent such as acetylene glycol, an antiseptic agent such as a thiazolone compound, and the like in an amount within such a range that the objects of the present invention are not prevented.

An important characteristic of the present invention is that a monoterpene or sesquiterpene is contained in the waterbased ink composition for ink-jet printing. Because of the incorporation of the monoterpene or sesquiterpene, when the resulting ink composition is used for printing, the coloring property of the printed images is remarkably improved and the stable printing can be continuously carried out without distorting the printed images.

Concrete examples of the monoterpene or sesquiterpene are, for instance, a monoterpene such as d-limonene, l-imonene, dl-limonene or terpineol, sesquiterpene, natural extracts such as lemon oil and orange oil containing the above-mentioned terpenes, and the like. They can be used alone or in an admixture thereof. Among these terpenes, limonene is preferably used from the viewpoint that the coloring property of the printed images is further improved.

The amount of the monoterpene or sesquiterpene is preferably 0.05 to 10 parts by weight, more preferably 0.05 to 5 parts by weight, most preferably 0.1 to 1.5 parts by weight per 100 parts by weight of the resulting ink composition. When the amount of the monoterpene or sesquiterpene is less than 0.05 part by weight, there is a tendency that the effect of blending the monoterpene or sesquiterpene is not sufficiently exhibited. When the amount is more than 10 parts by weight, there is a tendency that the effect is not exhibited any more in spite of increasing the amount and therefore it becomes uneconomic.

A method for preparing the waterbased ink composition for ink-jet printing of the present invention is not particularly limited. For example, there can be used a method comprising dispersing components containing the pigment, the aqueous medium, a monoterpene or sesquiterpene, and if necessary, other additives by means of a grinding mill such as beads mill, roll mill, jet mill or ultrasonic dispersion machine, and removing large particles, aggregates and the like contained in the obtained dispersion by centrifugation, filtration or the like so as to prevent an ink-jet nozzle from being stopped up.

The pH of the resulting waterbased ink composition for ink-jet printing of the present invention is preferably least 7, more preferably about 8 to about 10 at 20° C. in consideration of a case preparing the ink composition with the water-soluble resin neutralized with an alkali in the form of aqueous solution.

The waterbased ink composition for ink-jet printing of the present invention contains a monoterpene or sesquiterpene. Therefore, the ink composition does not stop up the nozzle and the ink of the printed images does not feather. The ink composition of the present invention enables continuous printing giving stable printed images without any distortion, as well as is excellent in coloring property and water resistance. Therefore, the ink composition of the present invention is suitably applicable to various ink-jet printing methods.

The waterbased ink composition for ink-jet printing of the present invention is more specifically described and explained by means of the following Examples in which all parts are parts by weight unless otherwise noted. It is to be understood that the present invention is not limited to the Examples, and various changes and modifications may be made in the invention without departing from the spirit and scope thereof.

EXAMPLES 1 TO 8 AND COMPARATIVE EXAMPLES 1 TO 3

Components of each composition shown in Tables 1 and 2 were dispersed in a ratio shown in these Tables by means of Dyno-Mill (made by Shinmaru Enterprises Corporation). Large particles were removed by centrifugation, and the obtained dispersion was filtrated by a membrane filter having a pore size of about 1 μm to give an ink composition.

TABLE 1

| | | Component (part) | | | | | |
|---|---|---|---|---|---|---|---|
| | | Aqueous medium | | | | | |
| | | Dispersing agent | | | | | |
| Example No. | Pigment | Water-soluble resin neutralized with alkali | Surfactant | Agent for imparting delayed drying property | Ion-exchanged water | Monoterpene or sesquiterpene | Other additives |
| 1 | Carbon black (6) | Styrene-acrylic acid copolymer (2) | — | Glycerol (10) Polyethylene glycol (5) Ethylene glycol (2) | (73.9) | d-Limonene (0.5) | pH regulator (0.2) Antifoaming agent (0.1) Antiseptic agent (0.3) |
| 2 | Naphtol red (6) | Styrene-acrylic acid copolymer (2) | Nonionic surfactant (2.5) | Glycerol (10) Polyethylene glycol (5) Ethylene glycol (2) | (71.4) | d-Limonene (0.5) | pH regulator (0.2) Antifoaming agent (0.1) Antiseptic agent (0.3) |
| 3 | Disazo yellow (7) | Styrene-acrylic acid copolymer (2) | Anionic surfactant (2.5) | Glycerol (10) Polyethylene glycol (5) Ethylene glycol (2) | (70.4) | Lemon oil (0.5) | pH regulator (0.2) Antifoaming agent (0.1) Antiseptic agent (0.3) |
| 4 | Phthalocyanine blue (6) | Styrene-acrylic acid copolymer (2) | — | Glycerol (10) Polyethylene glycol (5) Ethylene glycol (2) | (73.9) | Terpineol (0.5) | pH regulator (0.2) Antifoaming agent (0.1) Antiseptic agent (0.3) |
| 5 | Carbon black (6) | Styrene-acrylic acid copolymer (2) | — | Glycerol (10) Polyethylene glycol (5) Ethylene glycol (2) | (74.3) | d-Limonene (0.1) | pH regulator (0.2) Antifoaming agent (0.1) Antiseptic agent (0.3) |

TABLE 2

| | | Component (part) | | | | | |
|---|---|---|---|---|---|---|---|
| | | Aqueous medium | | | | | |
| | | Dispersing agent | | | | | |
| | Pigment | Water-soluble resin neutralized with alkali | Surfactant | Agent for imparting delayed drying property | Ion-exchanged water | Monoterpene or sesquiterpene | Other additives |
| Example No. | | | | | | | |
| 6 | Carbon black (6) | Styrene-acrylic acid copolymer (2) | — | Glycerol (10) Polyethylene glycol (5) Ethylene glycol (2) | (72.9) | d-Limonene (1.5) | pH regulator (0.2) Antifoaming agent (0.1) Antiseptic agent (0.3) |
| 7 | Carbon black (6) | Styrene-acrylic acid copolymer (2) | — | Glycerol (10) Polyethylene glycol (5) Ethylene glycol (2) | (71.4) | d-Limonene (3) | pH regulator (0.2) Antifoaming agent (0.1) Antiseptic agent (0.3) |
| 8 | Phthalocyanine blue (6) | Styrene-acrylic acid copolymer (2) | — | Glycerol (10) Polyethylene glycol (5) Ethylene glycol (2) | (69.4) | d-Limonene (5) | pH regulator (0.2) Antifoaming agent (0.1) Antiseptic agent (0.3) |
| Comparative Example | | | | | | | |
| 1 | Carbon black (6) | Styrene-acrylic acid copolymer (2) | — | Glycerol (10) Polyethylene glycol (5) Ethylene glycol (2) | (74.4) | — | pH regulator (0.2) Antifoaming agent (0.1) Antiseptic agent (0.3) |
| 2 | Carbon black (3) | Styrene-acrylic acid copolymer (1) | — | Glycerol (10) Polyethylene glycol (5) Ethylene glycol (2) | (78.4) | — | pH regulator (0.2) Antifoaming agent (0.1) Antiseptic agent (0.3) |
| 3 | Phthalocyanine blue (6) | Styrene-acrylic acid copolymer (2) | — | Glycerol (10) Polyethylene glycol (5) Ethylene glycol (2) | (74.4) | — | pH regulator (0.2) Antifoaming agent (0.1) Antiseptic agent (0.3) |

Each component shown in Table 1 and Table 2 is explained below.

Carbon black: Pigment Black 7
Naphthol red: Pigment Red 17
Disazo yellow: Pigment Yellow 74

Phthalocyanine Blue: Pigment Blue 15:3
Nonionic surfactant: polyoxyethylene alkyl ether (HLB 17)
Anionic surfactant: naphthalenesulfonate
pH regulator: aminomethylpropanol
Antifoaming agent: acetylene glycol
Antiseptic agent: thiazolone compound Each weight average molecular weight of the styreneacrylic acid copolymer and polyethylene glycol shown in Table 1 and Table 2 is, respectively 10000 and 400.

The particle diameter of the pigment contained in the dispersion (measured by means of coulter counter Type N4 commercially available from JAPAN SCIENTIFIC INSTRUMENTS COMPANY, Ltd.), pH at 20° C. and viscosity at 25° C. of the ink composition (measured respectively by means of a pH meter of Type PHL-10 commercially available from DKK Corporation, and by means of E-type viscosimeter commercially available from Tokyo Keiki Co., Ltd) are shown in Table 3.

The generation of feathering, coloring property, discharge stability in continuous printing and water resistance were examined as the properties of the obtained ink composition in accordance with the following methods. The results are shown in Table 3.

As Comparative Example 4, the properties of dyestuff ink (direct dyes) were also examined in the same manner as described above. The results are shown in Table 3.

(A) Generation of feathering

An ink jet printer (Bubble Jet Printer, BJ-10V commercially available from CANON INC.) was charged with each obtained ink composition and then images were printed on a paper sheet for plain paper copy (hereinafter referred to "paper for PPC"). The feathering of the drawn line of the printed images was observed with naked eyes and estimated in accordance with the following criterion for evaluation.

(Criterion for evaluation)

A: No feathering
B: Images discriminatable enough in spite of slight leathering
C: Images a little difficult in discrimination owing to a little leathering
D: Images considerably difficult in discrimination owing to remarkable leathering (B) Coloring property An OD value of images printed in the same manner as in (A) was measured by means of Macbeth densitometer commercially available from Division of Kollmorgen Instruments Corporation.

(C) Discharge stability in continuous printing

The ink jet printer was charged with each obtained ink composition, and images were continuously printed on 300 sheets of paper for PPC. A distortion of the printed images on the 300th paper and the stopping up of nozzle were observed with naked eyes and estimated in accordance with the following criterion for evaluation.

(Criterion for evaluation)

A: No distortion of printed images and no stopping up of nozzle
B: Slight distortion of printed images and no stopping up of nozzle
C: Distortion of printed images and stopping up of nozzle which can be dissolved by cleaning nozzle
D: Remarkable distortion of printed images and remarkable stopping up of nozzle which cannot be dissolved by cleaning nozzle (D) Water resistance Images printed in the same manner as in (A) were dried at room temperature, and water was dropped on the printed images by a spuit. The flow of the ink composition and a feathering of the printed images were observed with naked eyes and estimated in accordance with the following criterion for evaluation.

(Criterion for evaluation)

A: No change
B: A little flow of ink composition and slight feathering
C: Flow of ink composition and feathering
D: Remarkable flow of ink composition and remarkable feathering

TABLE 3

| | Average particle diameter of pigment ($\mu$m) | pH | Viscosity (cP) | Generation of feathering | Coloring property (OD value) | Discharge stability in continuous printing | Water resistance |
| --- | --- | --- | --- | --- | --- | --- | --- |
| Example No. | | | | | | | |
| 1 | 0.1 | 9.2 | 3.2 | A | 1.3 | A | A |
| 2 | 0.2 | 9 | 3.3 | A | 1.2 | A | B |
| 3 | 0.18 | 9.1 | 3.1 | A | 1 | A | B |
| 4 | 0.14 | 9.1 | 3.3 | A | 1.1 | A | A |
| 5 | 0.1 | 9.3 | 3.2 | A | 1.3 | A | A |
| 6 | 0.1 | 9.1 | 3.2 | A | 1.3 | A | A |
| 7 | 0.1 | 9.1 | 3.2 | A | 1.2 | A | A |
| 8 | 0.14 | 9.1 | 3.5 | B | 1.1 | A | A |
| Comparative Example | | | | | | | |
| 1 | 0.1 | 9.1 | 3.2 | A | 1.1 | D | A |
| 2 | 0.1 | 9 | 2.2 | A | 1 | D | A |
| 3 | 0.14 | 9.2 | 3.2 | A | 0.9 | D | A |
| 4 | — | 9.4 | 2 | B | 1.2 | A | D |

As shown in Table 3, the ink compositions of the present invention obtained in Examples 1 to 8 give excellent printed images which hardly feather as well as have high OD values and are excellent in coloring property. Furthermore, the ink compositions of the present invention are excellent in water resistance, and even if the images are printed continuously, they do not stop up the nozzle, causing no distortion of the printed images.

In addition to the ingredients used in the Examples, other ingredients can be used in the Examples as set forth in the specification to obtain substantially the same results.

What is claimed is:

1. A method for printing an image with a waterbased ink composition by discharging said ink composition from an ink-jet printer wherein said waterbased ink composition comprises a pigment, an aqueous medium and a monoterpene or sesquiterpene.

2. The method of claim 1, wherein said monoterpene is d-limonene, l-imonene, dl-limonene or terpineol.

3. The method of claim 1, wherein said monoterpene or sesquiterpene is present in an amount of 0.05 to 10 parts by weight per 100 parts by weight of said waterbased ink composition.

4. The method of claim 1, wherein the average particle diameter of said pigment is 0.01 to 3 $\mu$m.

5. The method of claim 1, which further contains an agent for imparting a delayed drying property.

6. The method of claim 5, wherein said agent for imparting delayed drying property is a polyhydric alcohol, a saccharide, an amine or an amide.

7. The method of claim 5, wherein said agent for imparting a delayed drying property is present in an amount of about 3 to about 50 parts by weight per 100 parts by weight of said waterbased ink composition.

* * * * *